Oct. 29, 1929.                 C. S. WILSON                 1,733,289
                            DIRIGIBLE SPOTLIGHT
                           Filed Sept. 8, 1928          2 Sheets-Sheet 2
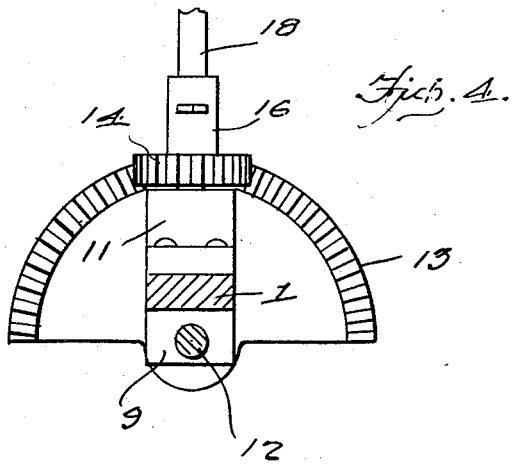
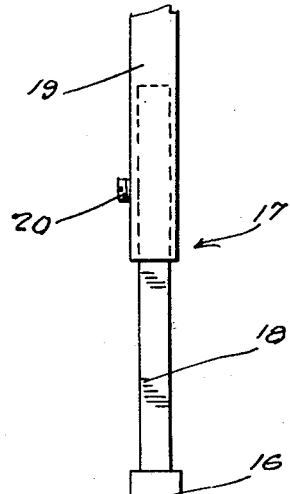
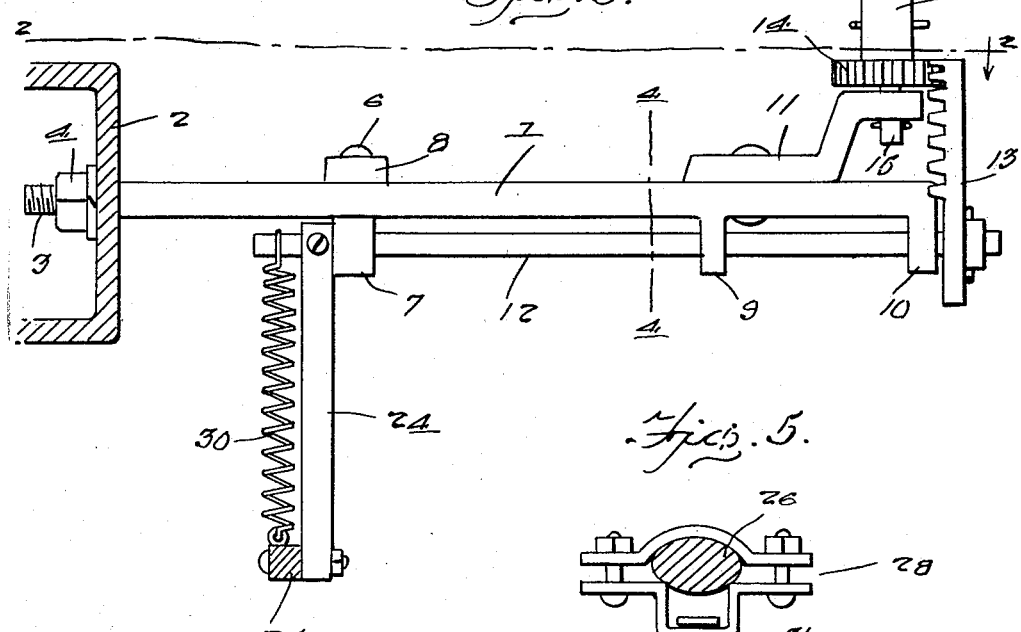
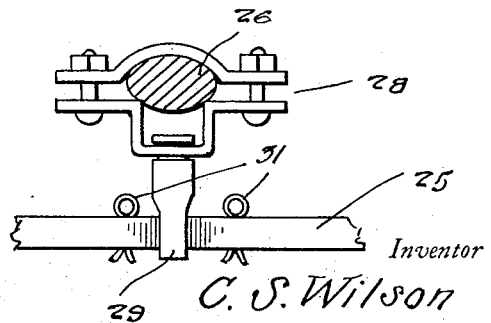
Inventor
C. S. Wilson
By Clarence A. O'Brien
                  Attorney Patented Oct. 29, 1929

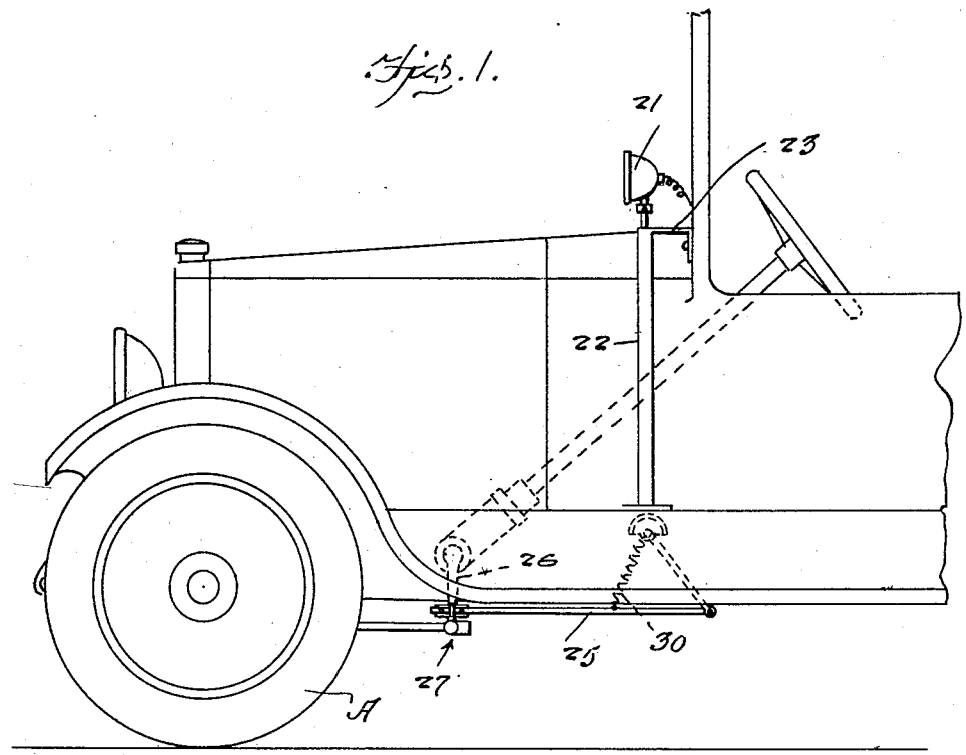
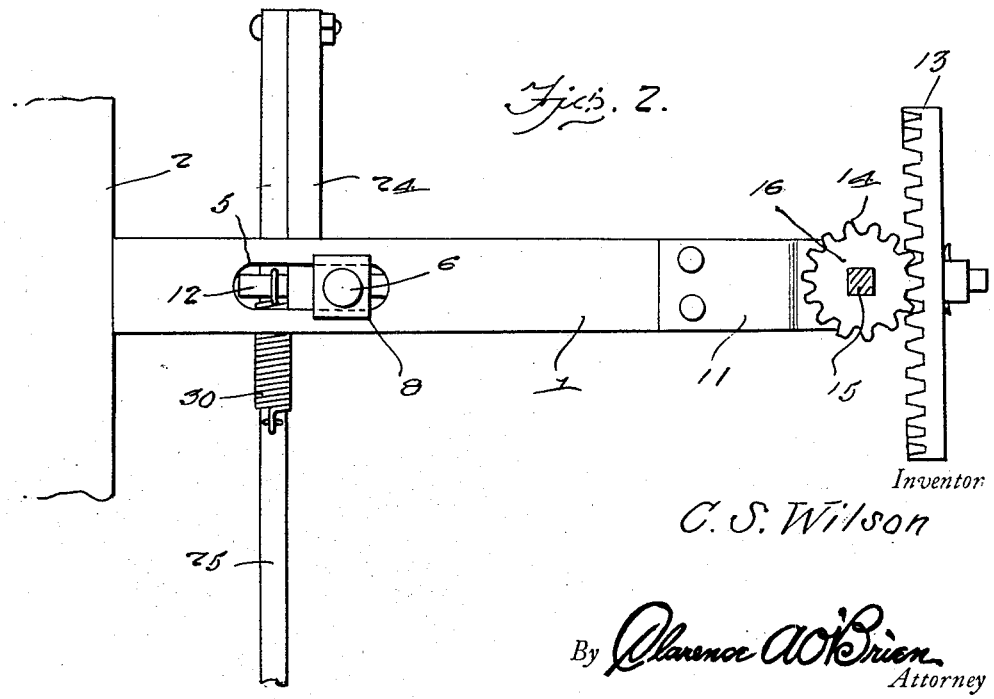

1,733,289

UNITED STATES PATENT OFFICE

CHARLES S. WILSON, OF CLINTON, INDIANA

DIRIGIBLE SPOTLIGHT

Application filed September 8, 1928. Serial No. 304,677.

The present invention relates to improvements in spotlights for use upon automobiles, and has reference more particularly to a dirigible spotlight that will automatically turn with the steering wheels of the vehicle, so that the road in front of the vehicle may be properly illuminated to enable the driver to readily ascertain the condition of the road when making a turn in either direction.

A further object is to provide a dirigible spotlight of the above mentioned character that can be mounted on an automobile without necessitating any material alterations of the parts of the automobile with which the invention is to be associated, the spot light being at all times positive and efficient in its operation.

Still a further object is to provide a dirigible spotlight of the above mentioned character, which is simple in construction, inexpensive, strong and durable and further well adapted to the purpose for which it is designed.

Other objects of the invention will become apparent as the nature of the invention proceeds and when taken in connection with the accompanying drawings.

In the accompanying drawings, forming a part of this application, and wherein like reference characters designate like parts throughout the several views:

Figure 1 is a side elevation of the dirigible spotlight embodying my invention, showing the same mounted on an automobile and operatively connected with the steering mechanism.

Figure 2 is a sectional view, taken approximately on the line 2—2 of Figure 3, illustrating the supporting bar and the mounting for the rocker shaft and further illustrating the connection between the outer end of said shaft and the headlight supporting standard.

Figure 3 is a side elevation of the mounting for the rocker shaft and the spotlight supporting standard.

Figure 4 is a vertical sectional view, taken approximately upon the line 4—4 of Figure 3, looking in the direction of the arrows, and Figure 5 is a detail view, showing the manner in which the connecting rod is secured to the steering arms.

In the drawings, wherein for the purpose of illustration is shown the preferred embodiment of my invention, the numeral 1 designates an elongated flat bar that extends transversely adjacent one side of the frame of the automobile. The inner end of this bar is formed with a reduced threaded bolt forming portion 3, that extends through an opening in the vertical wall of the angle iron frame 2 and on which bolt is threaded the nut 4, for engagement with the inner side of the vertical wall of the frame, in the manner as more clearly illustrated in Figure 3.

The bar 1 is formed at its inner end portion with the longitudinally extending slot 5, through which projects the bolt 6 that is carried by the bearing 7, and a nut 8 is threaded on the bolt for engagement with the top face of the flat bar 1, for adjustably securing the bearing on the under side of said bar. A stationary bearing 9 is arranged on the underside of the outer end portion of the bar as clearly illustrated in Figure 3.

The outer end of the flat bar terminates in the downwardly disposed portion 10, that is formed with an opening, whereby this portion of the bar also constitutes a bearing. An angular bracket 11 is arranged on the upper face of the outer end portion of the bar 1.

A rocker shaft 12 extends through the bearings 7 and 9 and the outer end of this shaft projects through the apertured depending portion 10, which also constitutes a bearing. Secured on the outer end of this rocker shaft 12 is the segmental gear 13, the gear teeth of which mesh with the pinion 14 arranged on the stub shaft 15, that constitutes a part of the spot light supporting standard. This stub shaft has its lower portion journaled in a suitable opening formed in the horizontal portion of the angular bracket 11, while arranged on the upper end of the stub shaft is a socket 16.

The standard is denoted generally by the reference character 17 and the same consists of a square rod section 18 that is secured at its lower end in the socket 16. A tubular upper section 19 forms a part of the telescopic standard 17 and this tubular section 19 is slidably fitted over the upper end of the lower rod section 18, and a set screw 20 provides a means for adjustably securing the slidable upper section 19 on the lower section 18.

The standard 17 extends upwardly adjacent the side of the body and the windshield frame, it being understood, of course, that a suitable opening is formed in the apron portion of the body of the automobile to accommodate the standard.

A spotlight designated generally by the numeral 21 is secured on the upper end of the upper tubular section 19 of the telescopic standard 17, for movement therewith in any appropriate manner.

A tubular housing 22 is provided for the telescopic standard 17 and the lower end of this housing is secured to the apron portion of the automobile body in any appropriate manner, while the upper end of the tubular housing is held stationary through the medium of the bracket 23 that is secured to the automobile body adjacent the windshield frame, as shown in Figure 1.

The operating means for the rocker shaft 12 includes a depending arm 24 that is rigidly secured to the inner end of the rocker shaft and connected to the lower end of this arm that is directed rearwardly is the rear end of the connecting rod 25. This connecting rod is, in turn, operatively associated with the steering arm 26 of the steering mechanism of the automobile, said steering mechanism being denoted generally by the reference character 27.

A sectional clamp 28 encircles the steering arm 26 and is connected to the forward end of the connecting rod 25 by means of the member 29 in the manner as clearly illustrated in Figure 5.

A coil spring 30 connects the intermediate portion of the connecting rod 25 with the inner end of the rocker shaft 12.

It is to be understood, of course, that the connection between the steering mechanism and the rocker shaft 12 is of such a character that when the steering wheels A of the automobile are turned, the rocker shaft 12 will be actuated to simultaneously turn the standard and the spotlight secured thereon upon a vertical axis in the direction in which the wheels A have been turned so that the light from the spotlight will follow exactly the course pursued by the steering wheels when rounding curves or the like, thus enabling the operator of the vehicle to at all times have a full view of the road over which the vehicle is travelling.

While I have shown the spotlight as being mounted on the side of the automobile, the same can equally as well be mounted at any other desirable place, such as in front of the radiator, and I do not wish to limit myself to the particular location of the spotlight.

It will thus be seen from the foregoing description that I have provided a dirigible spotlight that will, at all times, be positive and efficient, as well as automatic in its operation, and due to its simplicity, the same can be readily and easily installed on an automobile, without necessitating any material alterations.

The connecting rod 25, by having a sliding movement through the guide 29 allows the automobile wheels to have a slight movement, as in ordinary driving without the spotlight moving. The cotter pins 31 that extend through the connecting rod 25 on opposite sides of the guide 29 are to be set according to the range of the headlights. The spot light will make no movement until a sufficient turn has been made to cause one of the pins 31 to engage with the adjacent side of the guide 29.

While I have shown the preferred embodiment of my invention, it is to be understood that various changes in the size, shape and arrangement of parts may be resorted to without departing from the spirit of the invention or the scope of the appended claims.

I claim:

1. In combination with a motor vehicle and its steering mechanism, an elongated bar for disposition transversely adjacent the outer side of the frame of the motor vehicle, means for securing the inner end of the bar to the adjacent portion of the frame to support said bar in a stationary manner, bearings carried by the under side of the bar, an angular bracket arranged on the outer end portion of said bar, a rocker shaft journaled through said bearings, a segmental gear on the outer end of the rocker shaft, a vertical standard journaled at its lower end in the horizontal portion of the annular bracket, a pinion on the lower end portion of the standard for meshing engagement with the segmental gear, a spotlight secured on the upper end of the standard for rotation therewith, and means for cooperatively connecting the inner end of the rocker shaft with the steering mechanism for moving the spotlight about a vertical axis when the steering mechanism is actuated.

2. In combination with a motor vehicle and its steering mechanism, an elongated bar for disposition transversely adjacent the outer side of the frame of the motor vehicle, means for securing the inner end of the bar to the adjacent portion of the frame to support said bar in a stationary manner, bearings carried by the under side of the bar, an angular bracket arranged on the outer end portion of said bar, a rocker shaft journaled through said bearings, a segmental gear on the outer end of the rocker shaft, a sectional vertical standard including a socket member, a stub shaft formed on the lower closed end of the socket member for disposition in the horizontal portion of the angular bracket, a pinion carried by the stub shaft for meshing engagement with the segmental gear, telescopic sections included in the standards, the lower end of the lower section being secured in the socket member, a spotlight secured on the upper end of the upper section of the standard for rotation with said standard, and means for operatively connecting the inner end of the rocker shaft with the steering mechanism for moving the spotlight about a vertical axis when the steering mechanism is actuated.

In testimony whereof I affix my signature.

CHARLES S. WILSON.